(12) United States Patent
Bouquier et al.

(10) Patent No.: US 6,961,352 B2
(45) Date of Patent: Nov. 1, 2005

(54) METHOD OF SYNCHRONIZING A RADIO TERMINAL OF A RADIO COMMUNICATION NETWORK AND A CORRESPONDING RADIO TERMINAL

(75) Inventors: Jean-Francois Bouquier, Madrid (ES); Benoit De Cacqueray, Paris (FR); Javier Sanchez Araujo, Rueil-Malmaison (FR); Elie Bejjani, Baabda (LB)

(73) Assignee: Alcatel, Paris (FR)

( * ) Notice: Subject to any disclaimer, the term of this patent is extended or adjusted under 35 U.S.C. 154(b) by 705 days.

(21) Appl. No.: 09/796,797

(22) Filed: Mar. 2, 2001

(65) Prior Publication Data

US 2001/0040884 A1 Nov. 15, 2001

(30) Foreign Application Priority Data

Mar. 3, 2000 (EP) ............................................ 00440066

(51) Int. Cl.$^7$ ................................................ H04J 3/06
(52) U.S. Cl. .................................................... 370/503
(58) Field of Search ................................ 370/503, 509, 370/510, 511, 512, 513, 514, 206, 319, 324, 328

(56) References Cited

U.S. PATENT DOCUMENTS

| 5,177,740 | A | | 1/1993 | Toy et al. |
| 5,524,127 | A | | 6/1996 | Petranovich |
| 6,304,619 | B1 | * | 10/2001 | Citta et al. ................. 375/343 |

FOREIGN PATENT DOCUMENTS

| EP | 0 601 629 A2 | 6/1994 |
| WO | WO 00/33471 | 6/2000 |

* cited by examiner

Primary Examiner—Chi Pham
Assistant Examiner—Anh-Vu H Ly
(74) Attorney, Agent, or Firm—Sughrue Mion, PLLC

(57) ABSTRACT

The invention relates to a method for synchronizing a radio terminal in a radio-communication network with a received signal flow comprising a predefined synchronization sequence repeated at predefined time intervals. According to the invention, the method consists in generating correlation profiles at the radio terminal by correlating a part of said signal flow with the synchronization sequence to reveal correlation peaks and accumulating as many correlation profiles as necessary, until a threshold level is reached by at least the largest correlation peak. The threshold level is updated, during the accumulation, depending on a background noise level estimated in the signal flow to dynamically determine if the synchronization sequence has been detected at the radio terminal.

6 Claims, 2 Drawing Sheets

METHOD OF SYNCHRONIZING A RADIO TERMINAL OF A RADIO COMMUNICATION NETWORK AND A CORRESPONDING RADIO TERMINAL

BACKGROUND OF THE INVENTION

The present invention relates to a synchronization acquisition scheme for radio terminals of a radio communication network.

In the description below, the radio communication network may be a second generation mobile communication network as IS-95 or GSM as well as, a third generation cellular mobile radio communication networks based on Code Division Multiple Access (CDMA) as UMTS, or any other radio communication network where a radio terminal has to acquire synchronization before setting up a communication with the network.

The problem of acquisition can be seen as an attempt to synchronize in time the radio terminal clock to that of the base station.

In the following description will be assumed that a radio terminal is attempting synchronization for the first time before starting any communication mechanism. This procedure is known as slot synchronization. This invention concerns not restrictively the slot synchronization, it can be extended to frame synchronization or another similar application.

Within a cellular mobile radio communication network, a radio terminal, when switched on, must find among several surrounding base stations, the base station which provides the strongest signal power and acquire its synchronization before beginning a communication. Each base station of a cellular mobile radio communication network is responsible for including synchronization sequences in the transmitted signal flow so that a radio terminal is able to acquire, from the received signal flow, the synchronization of the most appropriate base station. FIG. 1 shows the transmit part of a base station describing how the synchronization sequence is included in a transmitted signal flow. An IQ signal modulation and spread spectrum are illustrated in this example, the invention is however not restricted to this framework.

The transmit part of the base station comprises a multiplexer 11, scramblers 12, adders 13, pulse filters 14, a local oscillator 15, modulators 16. Multiplexer 11 multiplexes several channels CH1, . . . , CHn. The output of multiplexer 11 is duplicated and transmitted on two parallel paths called I and Q. On path I as well as on path Q, the output of multiplexer 11 is connected to a scrambler 12, added a predefined quantity at adder 13, and submitted to pulse filter 14. The output of pulse filter 14 is modulated at modulator 16 with a signal delivered from local oscillator 15 on path I, and from a signal derived from oscillator 15 and shifted by pi/2 on path Q. The output of said modulators 16 on path I and on path Q are added and transmitted on the radio channel. The predefined quantity Cp is periodically added at adder 13 on path I building a slot structure.

FIG. 2 represents a time axis showing the slot structure supported by both path I and path Q. Each time slot on path I has a duration of TS and comprises the predefined synchronization sequence Cp, called synchronization sequence, at the same position in each time slot. Preferably the synchronization sequence is at the beginning of the time slot and has a duration SYNC shorter than the whole slot duration. For example in current UMTS standard the time slot duration is equal to 2560 times the chip duration while the synchronization sequence duration is equal to 256 times the chip duration. Each time slot on path Q comprises a predefined quantity Csi. Assumed that a frame comprises M time slots, M quantities Csi $1<=i<=M$ are defined and successively included at the same position in each one of the M time slots constituting the frame. Preferably, the predefined quantities Csi are located at the beginning of the time slot on path Q and have the same duration SYNC as the synchronization sequence Cp.

The predefined synchronization sequence Cp may be a Gold sequence of length 256.

Alternatively, the use as predefined synchronization sequence Cp of "A new correlation sequence for the primary synchronization code with good correlation properties and low detector complexity," Tdoc SMG2 UMTS L1 427/98 introduces the concept of hierarchical sequences. Such synchronization sequences have computation repetition properties within the correlation. Correlation computation using hierarchical sequences, introduces intermediate values which can be frequently reused along the correlation procedure. The synchronization sequence Cp may also be the one described in "Generalized hierarchical Golay sequence for PSC with low complexity correlation using pruned efficient Golay correlators" 3G TS 25.101 v3.1.0 (1999-12). The above mentioned synchronization sequences are only cited for purpose of illustration, the present invention does not depend on the used synchronization sequence.

The initial synchronization procedure at the radio terminal comprises usually the following three steps:

Step 1: Slot (chip) synchronization. The radio terminal uses I path to get slot (chip) synchronization to the strongest base station.

Step 2: Frame synchronization and sub-group identification. This step allows to determine the position of the slot detected in Step 1 within the frame. For this purpose, the radio terminal uses path Q.

Step 3: Base station identification. The radio terminal finally determines the scrambling code that identifies the strongest base station.

Slot synchronization at the radio terminal is achieved by using a filter matched to the predefined synchronization sequence Cp repeatedly emitted by each base station, on a slot-by-slot basis. In fact, for each part of the signal flow received at the radio terminal and having a duration of a time slot, the synchronization sequence is present inside this part of signal flow. As the radio terminal does not have any a priori knowledge of the exact position of the synchronization sequence, the radio terminal has to perform several correlations to detect the beginning of the synchronization sequence. Assumed that a time slot contains N chips and that the sampling factor is equal to 1, a correlation profile P is preferably composed of the result of N correlations $P(1), \ldots, P(N)$ of a part of the signal as large as the synchronization sequence with the synchronization sequence itself. The part of the signal considered is shifted by a chip duration or, more generally speaking, by a sample of it, for each successive correlation.

The result $P(k)$ of the correlation between the part of the signal flow shifted by k chip durations (assuming a sampling factor of 1) and the predefined synchronization sequence Cp is given by equation:

$$P(k) = \sum_{i=0}^{n-1} Cp(i) \cdot r(i+k)$$

where r(t) is the received signal flow at time t, k=1,2, ..., N and n equals the size of sequence Cp.

If the sampling factor is higher than 1, for example 2 or 4, the number or correlations to be performed to generate a correlation profile is preferably equal to N*sampling factor.

The correlation profile reveals correlation peaks for each base station located in the surroundings of the radio terminal. Detection of the position of the strongest peak gives the timing of the base station providing the strongest signal power at the radio terminal. The synchronization acquisition at the radio terminal further consists in comparing the strongest peak with a threshold value.

Known solutions consist in:
accumulating peaks over a variable number of slots and comparing the strongest peak with a fixed threshold value, or
non-coherently accumulating peaks over a fixed number of slots and comparing the strongest peak with a variable threshold value.

These two solutions lead to an important computing time and energy consumption at the radio terminal.

The method shown in WO-9731428 involves generating a number of user channels, a side channel and a null channel by a base station. Each channel uses a different pn code and the channels are applied to a transmitter. A number of subscribers receive the signals, despread the signals using their assigned pn codes and measure the received signal level. The obtained received signal level is used when the phase of a second pn code is set which corresponds to the side-channel to achieve synchronization.

This document doesn't disclose a method for optimization of the number of time slots needed to achieve synchronization.

The method shown in EP-852430 involves receiving a control signal in the control channel of a base station, a part of the control signal in every long code period is spread only by the specific short code, and other parts of the control signal are spread by one of the synthesized spread code sequence. The control signal is correlated with the specific short code to produce a correlation signal. A long code synchronization timing of the control signal is determined based on the correlation signal. The correlation between the control signal and segments of the synthesized spread code sequences is detected, the synthesized spread code sequences are synthesized from the different long codes and the specific short code. Each segment is taken from a portion of a respective one of the synthesized spread code sequences, starting from a first position in a first of the synthesized spread code sequences from where a first segment is taken, and in successive synthesized spread code sequences, starting from a position in each successive synthesized spread code sequence which is shifted by a set shifting amount from where a preceding segment was taken from a preceding one of the synthesized spread code sequences. The set shifting amount is less than a length of each segment, and the control signal and each segment are synchronized by the long code synchronization timing. The different long codes synthesizes the one of the synthesized spread code sequences is identified, which corresponds to the control signal, based on the electric power level of the correlation signal.

This prior art document doesn't discloses means for optimization of the process.

The method shown in U.S. Pat. No. 5,570,349 involves measuring the time base error of each handset at the base station. Time base correction information is transmitted from the base station to each handset. The timing of operation of each handset is thus controlled.

The power of the sounding signal is measured. The compensation of the handset transmit power using instantaneous power control of handset to base station link is performed so as to avoid signal interference.

The major drawback of these solutions relies in the way of determining the number of slots to get reliable synchronization. When the number of slots is too long, an unnecessary amount of computations is performed. Conversely, when the number of slots is too short, the probability of acquiring wrong synchronization will be increased. In such a case, the mobile terminal will perform the procedures that follow synchronization with low reliability so that the need for restarting the whole synchronization mechanism will be very likely. Accumulating the matched filter outputs over a large number of slots does not guarantee a reliable estimation of the strongest base station.

SUMMARY OF THE INVENTION

A particular object of the present invention is to optimize the power consumption at a radio terminal of a cellular mobile radio communication network while acquiring synchronization.

This object is achieved by a method for synchronizing a radio terminal in a radio-communication network with a received signal flow comprising a predefined synchronization sequence repeated at predefined time intervals. The method comprises the steps of:
generating a correlation profile at the radio terminal by correlating a part of the signal flow with the synchronization sequence to reveal correlation peaks;
accumulating as many correlation profiles as necessary, until a threshold level is reached by at least the largest correlation peak; and
updating, during the accumulation, the threshold level depending on a background noise level estimated in the signal flow to dynamically determine if the synchronization sequence has been detected at the radio terminal.

The invention consists thus in accumulating a variable number correlation profiles and a comparing the largest correlation peak to a variable threshold level, updated each time a further correlation profile is taken in account.

The background noise level corresponds to the energy accumulated when at least the strongest peak energy is removed from the correlation profile. Accumulation is made until the strongest peak reaches an optimal threshold level.

The invention has the advantage to reduce cell search time, and consequently, energy consumption at the radio terminal. Moreover, this technique can be used for preparing soft handover.

The optimal threshold is defined according to a desired quality, in terms of detection probability, without constraints concerning the number of accumulations. Compared with commonly used cell search techniques, the invention is more robust in variable propagation channel scenarios and the average time for obtaining reliable synchronization is reduced.

The present invention also concerns a radio terminal comprising means to support the method according to the invention.

BRIEF DESCRIPTION OF THE DRAWINGS

Other characteristics and advantages of the invention will become apparent from the following detailed description when read in conjunction with accompanying drawings, in which.

DETAILED DESCRIPTION OF THE INVENTION

Figure 1:
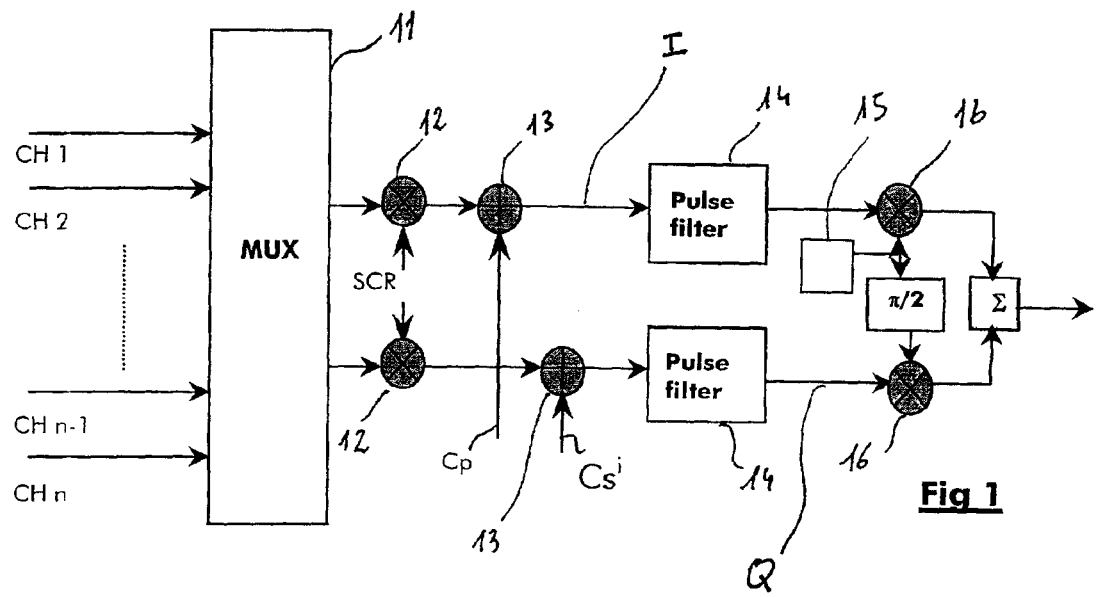
FIG. 1 is a block diagram of a base station of a cellular mobile radio communication network.
Figure 2:
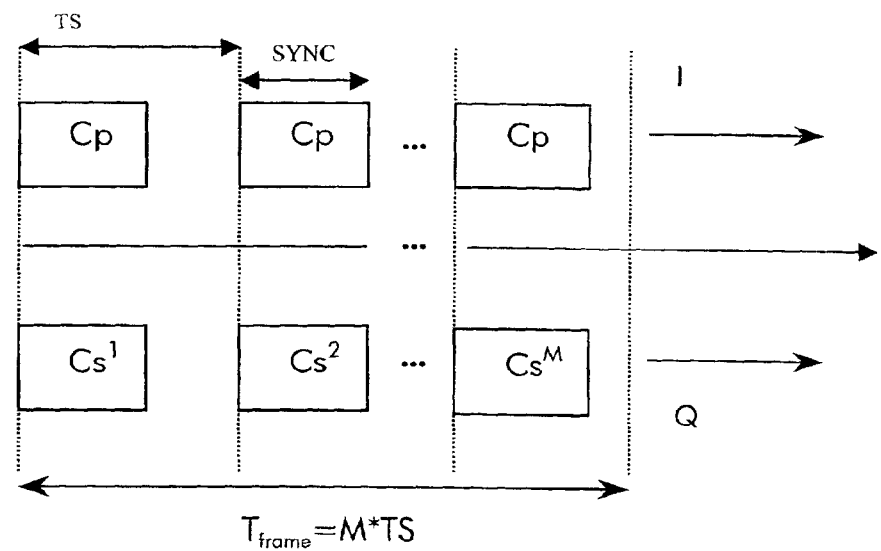
FIG. 2 is shows a channel structure on path I and Q.

FIG. 1 and FIG. 2 have already been described in relation with prior art. It is assumed in the following description that a radio terminal receives a signal having the characteristics of the signal showed on the already described FIG. 2.

Figure 3:
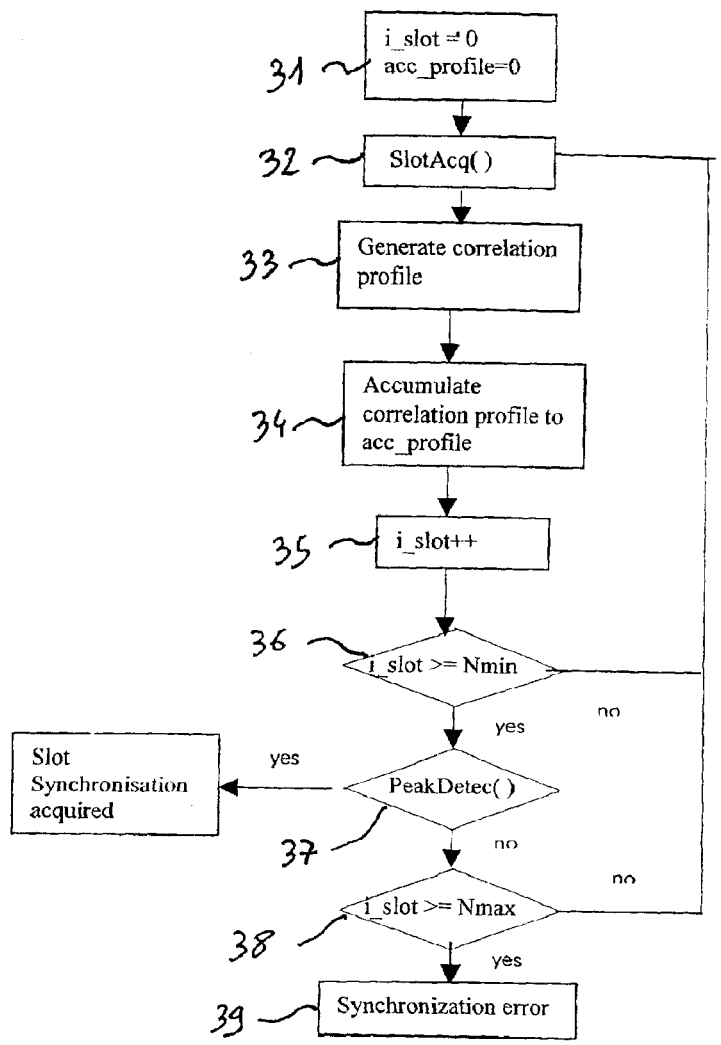
FIG. 3 is a flow diagram of an implementation of the method according to the invention.

FIG. 3 represents a flow diagram of an implementation of the method according to the invention.

This flow diagram corresponds to the slot synchronization acquisition processed at a mobile terminal of a radio communication network. The described slot synchronization acquisition may be part of an UMTS synchronization algorithm. The present invention is however not restricted to this application. The method comprises the following steps:

Step 31: initialize a slot counter i_slot and a variable acc_profile to zero.

Step 32: acquire a signal part having a duration equal to the predefined slot duration.

Step 33: generate a correlation profile by correlating the acquired signal part with the predefined synchronization sequence all along the time slot duration.

Step 34 accumulate the correlation profile of Step 33 with the value of the variable acc_profile.

Step 35: increment the slot counter i_slot.

Step 36: compare if the slot counter i_slot is lower than a predefined minimum number Nmin. If yes execute step 32. If not execute step 37

Step 37: Execute the procedure Peak_detect( ) for the already accumulated correlation profiles. If the result of the procedure indicates that the synchronization has been found, terminate the synchronization acquisition procedure. If not execute step 38.

Step 38: compare if the slot counter i_slot is higher than a predefined maximum number Nmax. If not execute step 32. If yes execute step 39.

Step 39: generate an error of synchronization.

In the method according to the invention, the procedure Peak_detect( ) can be summarized as follows:

A fixed quantity $R_{ref}$ is set by the user. A possible value for $R_{ref}$ is 5 dB.

For the already accumulated correlation profiles following measurements and computations are performed:

Emax: energy of the largest peak within the accumulated correlation profile

Emean: mean value of the energy of all the other peaks, the largest peak being excluded, computed over all accumulated correlation profiles.

the quantity $R_{est}$=Emax/Emean is calculated.

If $R_{est}$>$R_{ref}$, that is to say, if all quantities are expressed in dB, Emax>Emean+$R_{ref}$, the energy of the largest correlation peak is higher than the dynamic threshold level Emean+$R_{ref}$ then, the largest peak is considered to indicate the position of the synchronization sequence in the part of the signal flow acquired at step 32, otherwise, the process continues.

The method described above takes into account that it usually does not make sense to look for the strongest peak just after the first correlation profile is computed. Instead, several energy profiles should be computed and accumulated before making a decision. The variable acc_profile represents the accumulation of several correlation profiles obtained for several slots. This accumulation can be calculated as the sum of the obtained correlation profiles or as the average value of the correlation profiles. If the average value is considered and $N_{slot}$ is equal to the number of already accumulated correlation profiles, the variable acc_profile is equal to:

$$\text{acc\_profile} = \frac{1}{Nslot} \sum_{p=0}^{Nslot-1} profile(p)$$

where profile(p) is the correlation profile obtained for the $p^{th}$ slot

An important question is to determine the range of $N_{slot}$. A large value can improve the averaging, but it increases both the synchronization delay and power consumption which is important for this part of the acquisition. Advantageously, a maximum and a minimum value $N_{max}$ and $N_{min}$ respectively are fixed. As long as less than $N_{min}$ correlation profiles are accumulated, no detection is performed. As soon as $N_{max}$ correlation profile are accumulated, step 39 is executed. As already indicated, it can be considered that if by the accumulation of $N_{max}$ step 37 has not found out synchronization, not enough energy is available to detect properly the synchronization, one possible decision is to stop the synchronization process and generate a synchronization error to preferably retry the synchronization process later. Alternatively, for dealing with situations where the target value is never reached, as in high distorted propagation scenarios, step 39 can consist in a further path detection algorithm trying to identify all the reliable paths (if there are any) and ensuring a predefined identification error rate. For example, a second threshold $R_{min}$, less demanding than the first threshold $R_{ref}$, is defined and the more powerful correlation peak is compared to this second threshold. The second threshold $R_{min}$ could be proposed to ensure a minimum quality, while the first threshold $R_{ref}$ is chosen to ensure a desired quality.

Alternatively, instead of considering only the largest correlation peak, detectors taking into account more than one correlation peak as presented in R. R. Rick and L. B. Milstein, "Optimal decision strategies for acquisition of spread spectrum signals in frequency-selective fading channels," IEEE Trans. On Com. Vol. 46 No.5, May 1998 can be used. In this case, the time synchronization is determined by using a small window of length L rather than a single sample. It is up to the Rake Receiver to achieve finer synchronization and to perform the right path selection. But using this small window in the synchronization part allows to take a decision by considering a larger amount of energy.

The part of said signal flow acquired at step 32 may in another embodiment of the invention have a different duration than the time slot duration. A method enabling it to better localize the synchronization position in the time slot, using for example distance or propagation delay indications, may be used to limit the duration of the part signal of the signal flow to be considered and as a consequence to limit the number of correlations in the correlation profile.

Some performance of the proposed adaptive algorithm corresponding to the present invention are presented below. For simulation purposes, the scenario assumes one base station emitting the synchronization sequences at a power of 0 dB. The signal propagates in a one path Rayleigh channel.

Additive white Gaussian noise is added. The radio terminal moves at a speed of 3 km/h. A frequency error of 5000 Hz is also considered. The energy profiles for slot synchronization are computed first from 16 slots (1 frame) accumulations and then from 48 slots (3 frames) accumulations. The method used for generating and de-correlating sequence Cp is that described in "A new correlation sequence for the primary synchronization code with good correlation properties and low detector complexity," Tdoc SMG2 UMTS L1 427/98.

The method according to the present invention is applied using a reference value $R_{ref}$ equal to 5 dB. The minimum number of slots $N_{min}$ is fixed to 13 slots whereas the maximum number of slots allowed $N_{max}$ is 64 slots. The obtained results are reported in Table 1 for different a Carrier to Noise Ratio (CNR).

TABLE 1

|  | CNR | Error probability | Number of accumulations |
|---|---|---|---|
| Prior art | −17 dB | 0.120 | 48 (fixed) |
| Invention | −17 dB | 0.067 | 25 (adaptive) |
| Prior art | −19 dB | 0.230 | 48 (fixe) |
| Invention | −19 dB | 0.110 | 32 (adaptive) |

From the results depicted in Table 1, not only the error probability is reduced by using the method according to the invention, but also the average number of time slot accumulations. It shows that better results can be obtained by using an adaptive threshold than a fixed one. The differences in performance between the adaptive threshold approach and a classical one are increased as the CNR becomes higher.

Figure 4:
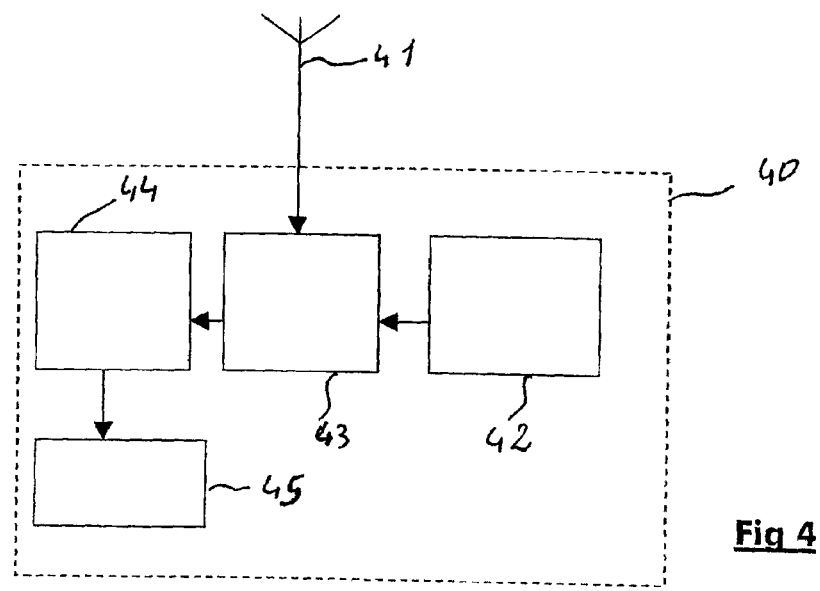
FIG. 4 is a block diagram of an embodiment of a radio terminal supporting the present invention.

FIG. 4 shows a block diagram of an embodiment of a radio terminal 40 part of a radio communication network and supporting the present invention. Radio terminal 40 comprises an antenna 41, an internal clock 42, a matched filter 43, an accumulator 44 and a processor 45.

Antenna 41 receives a signal flow preferably transmitted by a base station of the radio communication network. Internal clock 42 is able to determine a slot duration, the slot duration is a system parameter identical for all radio terminals and for all base stations of the radio communication network. Internal clock 42 preferably uses as time unit a chip duration or a sample of it. Internal clock 42 sends control messages to a signal flow captor not represented on FIG. 4 to start and stop transferring a part of received signal flow to matched filter 43. The part of the signal flow being transferred to matched filter 43 is preferably equal to a time slot duration. Matched filter 43 comprises correlators to compute a correlation profile revealing correlation peaks. The correlation profiles are accumulated in accumulator 44. Accumulator 44 preferably averages correlation profiles provided succesively from matched filter 43. The currently accumulated correlation profile is processed by processor 45 in order to detect the energy of the largest correlation peak and the average energy of the other correlation peaks, the largest correlation peak being excluded from this average energy. Processor 45 can access a memory position containing the value $R_{ref}$ and calculate the current threshold level to be compared with the energy level of the largest peak of the correlation profile. Processor 45 also detects, when the energy of the largest peak is greater than the threshold level, the position of the synchronization sequence in the accumulated correlation profile and deduce the time slot structure underlying the received signal flow. Processor 45 can, in a preferred embodiment of the invention, access memory location storing a maximum and a minimum number, respectively $N_{min}$ and $N_{max}$ to indicate a minimum and a maximum number of correlation profiles to accumulate in accumulator 44.

Alternatively, the threshold level calculated in processor 45 may be updated depending both on the correlation profile obtained in matched filter 43 and the accumulated correlation profile. For example if not each time slot contains the known synchronization sequence, and if a part of the signal flow as large as a time slot contains no synchronization sequence, the correlation profile may be flat. Advantageously, this flat correlation profile can be excluded from the accumulation. A condition to exclude a correlation profile may be based on the standard deviation of the energy of the different correlation peaks. If the standard deviation is higher than a predefined threshold the correlation profile will be accumulated at accumulator 44 if not the correlation profile will be dropped.

What is claimed is:

1. A method for synchronizing a radio terminal in a radio-communication network with a received signal flow, said signal flow comprising a predefined synchronization sequence repeated at predefined time intervals in said signal flow, said method comprising the steps of:

generating a correlation profile at said radio terminal by correlating a part of said signal flow with said synchronization sequence to reveal correlation peaks indicating the location of said synchronization sequence in said part of signal flow;

accumulating as many correlation profiles as necessary, until a threshold level is reached by at least the largest correlation peak, said correlation profiles being obtained with different parts of said signal flow, and updating, during said accumulation, said threshold level depending on a background noise level estimated in said signal flow, wherein said background noise level corresponds to a quantity representative of the energy of the correlation peaks in said already accumulated correlation profile, the energy of the largest peak being excluded from said quantity.

2. A method according to claim 1, wherein said background noise level corresponds to the mean value, Emean, of the energy of the correlation peaks in said already accumulated correlation profile, said energy of the largest correlation peak, Emax, being excluded from said mean value, said threshold level being calculated as the sum of a fixed quantity Rref in dB and said background noise level Emean in dB, the method comprises stopping the accumulation if Emax(dB)>Emean(dB)+Rref(dB).

3. A method according to claim 1, further comprising the step of stopping the accumulation when at most a predefined maximum value Nmax of correlation profiles have been accumulated.

4. A method according to claim 1, further comprising the step of fixing a predefined minimum number, Nmin, of correlation profiles to be accumulated before testing if said threshold level has been reached by said strongest correlation peak.

5. A radio terminal to be part of a radio-communication network, said radio terminal having a received signal flow comprising a predefined synchronization sequence repeated at predefined time intervals in said signal flow, said terminal comprising:

an internal clock;

a matched filter for generating a plurality of correlation profiles corresponding to correlation of different parts of said received signal flow with a known synchronization sequence to reveal correlation peaks indicating the location of said synchronization sequence in said part of said signal flow;

an accumulator for accumulating as many correlation profiles as necessary, until a threshold level is reached by at least the largest correlation peak; and means for updating, during the accumulation, the threshold level according to a background noise level estimated in said part of the signal flow being correlated, wherein said background noise level corresponds to a quantity representative of the energy of the correlation peaks in said already accumulated correlation profiles, the energy of the largest peak being excluded from said quantity.

6. A radio terminal according to claim 5, further comprising a memory for registration of a maximum and a minimum value Nmax and Nmin.

* * * * *